United States Patent [19]

Sun

[11] Patent Number: 5,242,478
[45] Date of Patent: Sep. 7, 1993

[54] METHOD OF CONTROLLING METAL OXIDATION DURING WAVEGUIDE FORMATION

[75] Inventor: C. Jacob Sun, Worthington, Ohio

[73] Assignee: Photonic Integration Research, Inc., Ohio

[21] Appl. No.: 810,399

[22] Filed: Dec. 19, 1991

[51] Int. Cl.⁵ .............................................. C03B 27/02
[52] U.S. Cl. ...................................... 65/32.2; 65/3.11; 65/59.23; 65/374.15
[58] Field of Search ............... 65/32.2, 59.23, 374.15, 65/59.4, 59.5, 3.11, 4.42

[56] References Cited

U.S. PATENT DOCUMENTS

| | | | |
|---|---|---|---|
| 2,882,116 | 4/1959 | Williams | 65/32.2 |
| 3,233,993 | 2/1966 | Weidel | 65/32.5 |
| 3,365,799 | 1/1968 | Buyers et al. | 65/32.2 |
| 4,687,540 | 8/1987 | Singhdeo et al. | 65/32.2 |
| 4,885,019 | 12/1989 | Hutta | 65/3.11 |

Primary Examiner—Robert L. Lindsay
Attorney, Agent, or Firm—Porter, Wright, Morris & Arthur

[57] ABSTRACT

An optical waveguide forming process is disclosed which enables glass waveguides to be deposited on metalized substrates without substantial degradation of the wiring of the substrate. The process involves the use of carbon material to protect the metal wiring on or embedded in the substrate during the consolidation phase of the waveguide formation. The carbon plate reacts readily with oxygen impurities to control the oxygen partial Pressure during the consolidation phase.

12 Claims, 3 Drawing Sheets

Oxygen Partial Pressure VS Temperature

METHOD OF CONTROLLING METAL OXIDATION DURING WAVEGUIDE FORMATION

BACKGROUND AND SUMMARY OF THE INVENTION

This invention relates generally to optical waveguides on substrates, and more particularly to a method of preventing metal wires from oxidizing during high temperature glass formation on metalized substrates.

Applicant incorporates by reference herein its previous U.S. Pat. application filed on Jun. 29, 1990 entitled "Apparatus and Method of Forming Optical Waveguides on Metalized Substrates" which has been granted U.S. Pat. No. 5,059,475. Also incorporated by reference herein is Applicant's previously filed U.S. Pat. Application Ser. No. 07/779,959 entitled "Optical Waveguide of Silica Glass Film on Ceramic Substrate." Flame hydrolysis deposition ("FHD"), a process which involves the deposit of powdered glass on a substrate and its subsequent fusion for consolidation into a solid glass at high temperatures, has been used to deposit waveguides for optical signal transmission on substrates. Other deposition methods such as chemical vapor deposition ("CVD") and sputtering have also been used to form optical waveguides on substrates.

Electronic IC chips are normally bonded to ceramic substrates to form either single chip or multi chip electronic modules. Connecting two or more chips on a Ceramic substrate is accomplished with wires Thus, the term metalized ceramic substrate is derived from the metal wires which are embedded in the substrate connecting the electronic devices. It is desirable to be able to integrate optics and electronics on the same substrate. One manner of doing this involves the formation of glass waveguide layers onto a surface of a metalized ceramic substrate.

The formation of the glass layers on the substrate requires high temperatures in the range of 1200°–1700° C. These high temperatures coupled with the oxygen in the surrounding atmosphere tend to cause the metal wires in the substrate to oxidize. With the present invention, metal wires will be saved when layers of silica glass are formed onto the ceramic substrate to form planar optical waveguides.

The waveguide forming process of FHD is followed by high temperature consolidation during which the metal wires on the substrate surfaces or imbedded in the substrate come under attack by the oxygen impurity in the consolidation furnace. Oxidation of the wires can cause a breakage in electrical signal and power transmission.

The present invention is designed to inhibit oxidation of the metal wires during the formation of silica waveguides on the substrate. The present invention protects the metalized substrates during the consolidation phase. In the method of the present invention, a carbon plate of any applicable geometry or shape is placed adjacent the metalized substrate to attract oxygen molecules approaching the substrate. The oxygen molecules will tend to react with the carbon plate first so that the metal wiring (such as copper, molybdenum, and tungsten and any other less reactive metallurgy) will be safe from oxidation during the high temperature consolidation phase.

The present invention involves the formation of optical waveguides on ceramic substrates such as AL2O3. Electronic or opto-electronic (0-E) IC chips may be bonded to the substrate, after the waveguides are formed. The optical waveguides perform as optical interconnects between electronic and 0-E chips. Therefore, the present invention is useful in making opto-electronic devices for communication and computer applications.

The method of the present invention is useful in applying a glass film on a substrate to be used as an optical waveguide. The glass film may be deposited directly onto the substrate or onto a coating on the substrate. Thin film, thick film, and multilayer ceramic (MLC) substrates can have these glass films deposited thereon to form waveguides and integrated optical circuits.

The foregoing and other objects and advantages of the invention will become more apparent when considered in view of the accompanying drawings and the following description

DESCRIPTION OF THE PREFERRED EMBODIMENT(S)

Figure 1:
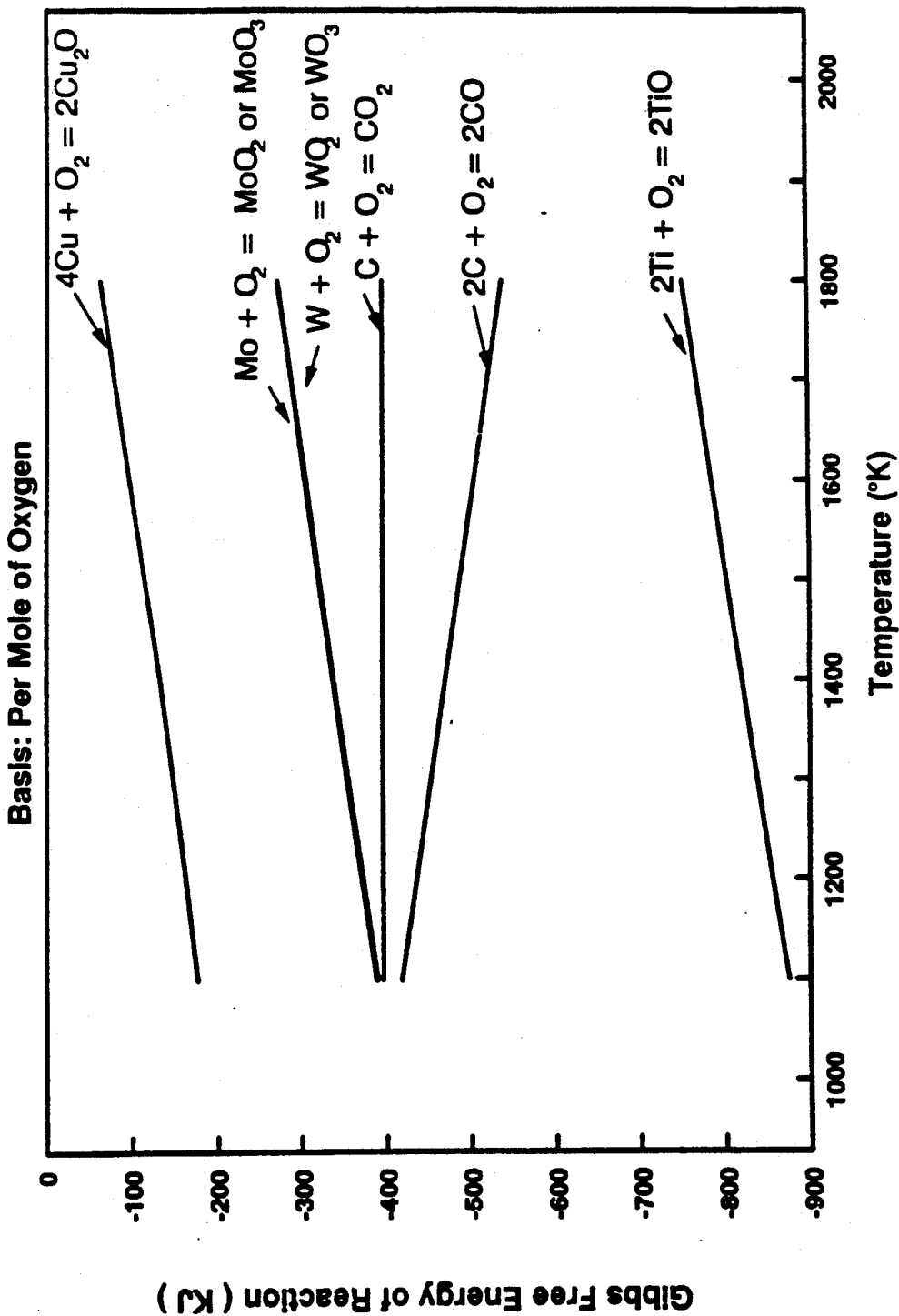
FIG. 1 is a graph of the free energy of reaction versus temperature.

Referring to the drawings, there is illustrated in FIG. 1 the Gibbs free energy of reaction expressed in kilojoules (kj) versus temperature. The graph depicts the reaction of various metals with oxygen (02). Judged from the Gibb's free energy of reactions, carbon is more reactive with oxygen than copper (Cu), tungsten (W), and molybdenum (Mo) but less reactive than titanium (Ti).

Figure 2:
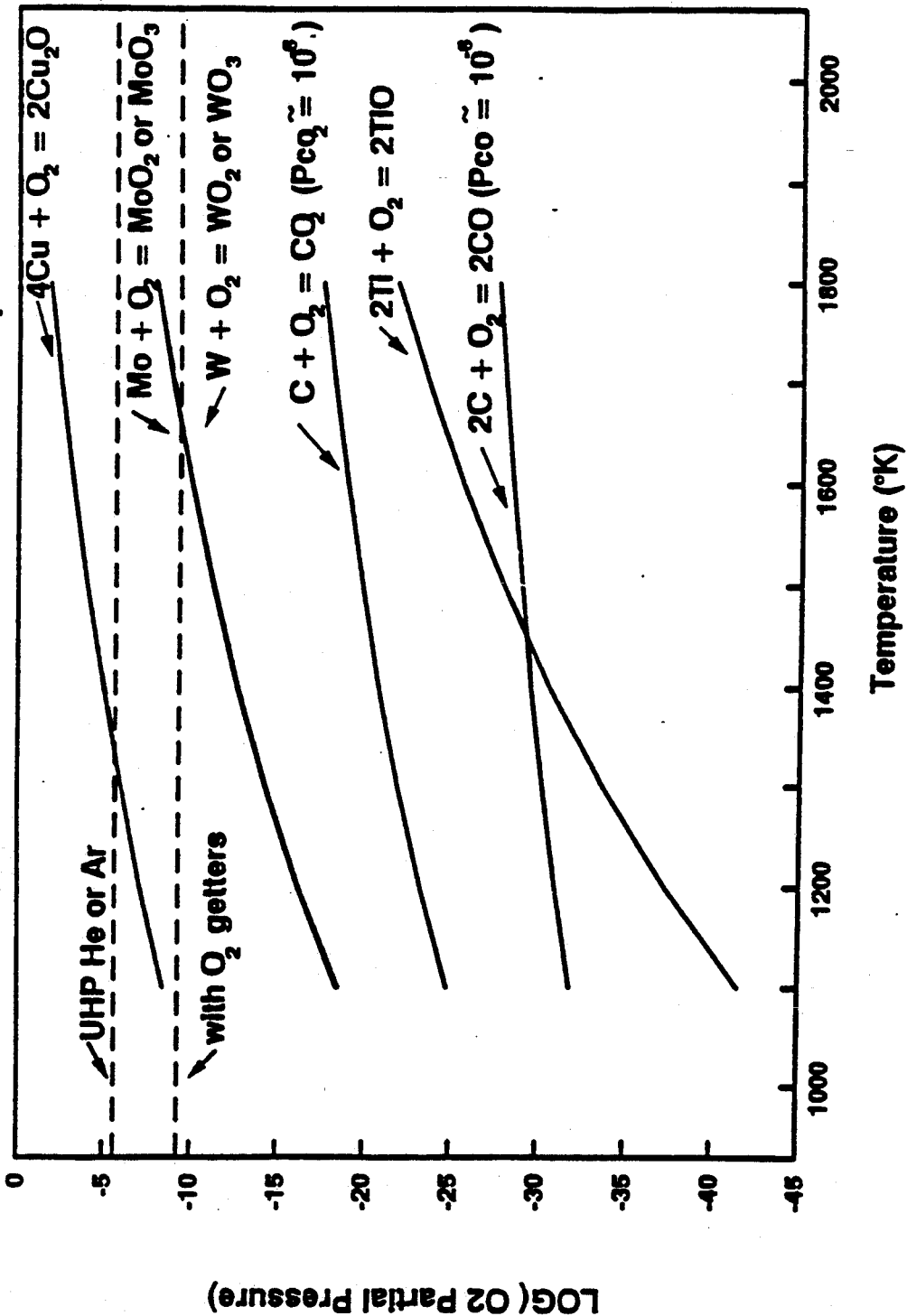
FIG. 2 is a graph of oxygen partial pressure versus temperature.

FIG. 2 shows a graph of oxygen partial pressure versus temperature as oxygen reacts with various metals much the same as shown in FIG. 1. From the graph it is apparent that a lower oxygen partial pressure is achieved when oxygen reacts with carbon as compared to other metals such as copper, molybdenum and tungsten.

Figure 5:
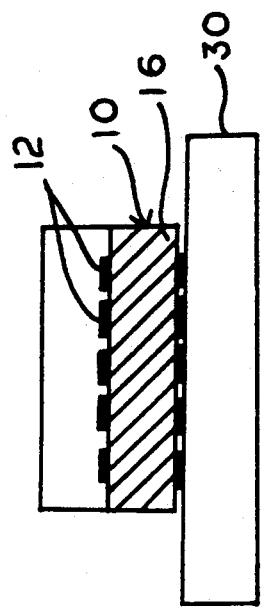
FIG. 5 is an alternative embodiment of the apparatus shown in FIG. 3.
Figure 6:
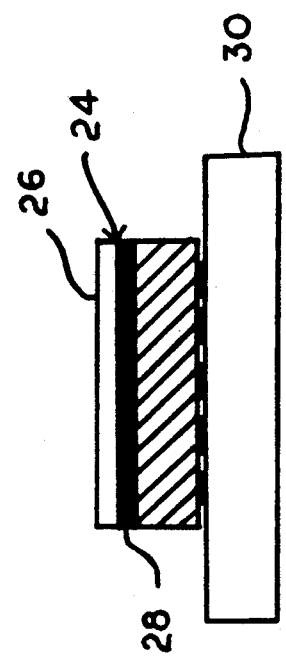
FIG. 6 is a view of the apparatus of FIG. 5 after the consolidation phase.
Figure 3:
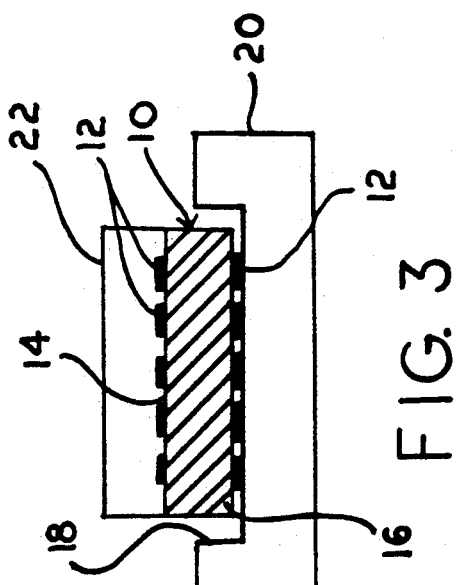
FIG. 3 is a sectional view of a glass layer deposited on a metalized substrate with the substrate placed on a carbon plate.
Figure 4:
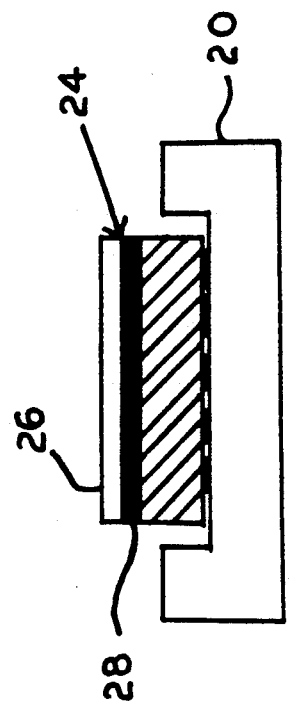
FIG. 4 is a view of the apparatus of FIG. 3 after the consolidation phase.

FIGS. 3, 4, 5 and 6 depict two examples of the apparatus described with the present invention FIG. 3 shows a metalized ceramic substrate 10 having metal wires 12 exposed on the top surface 14 and bottom surface 16 thereof resting within a pocket 18 of a carbon plate 20. On top of the metalized substrate 10 are placed glass soot layers 22 in preparation for consolidation. The glass soot layers 22 may be applied by the FHD process. FIG. 4 depicts the apparatus after the consolidation of the glass layers to form a waveguide 24 having a core layer 26 and a cladding layer 28. FIG. 5 is synonymous with FIG. 3 except in this embodiment the carbon Plate 30 is flat and does not contain a cradle or pocket for the metalized substrate 10. FIG. 6 is synonymous with FIG. 4 and depicts the apparatus of FIG. 5 after the consolidation step. The carbon plates can be arranged differently in the Present invention than the arrangements shown in these two examples as long as the carbon plate remains close to the substrate so that oxygen molecules will be consumed by the carbon before they reach the metal wiring.

During the waveguide forming process which may employ FHD followed by high temperature consolidation, the metal wires on the substrate surfaces (or embedded in the substrate) are attacked by the oxygen impurity in the consolidation furnace. By using the best grade of inert gas to purge the samples during the consolidation, the oxygen impurity can be reduced to 0.1–1.0 parts per million, i.e., $10^{-6}$ $10^{-6}$. With commercially available "oxygen getters" the oxygen can be further reduced to 10 parts per billion, i.e., $10^{-8}$. However, some metals are still oxidized by this amount of oxygen when the temperature is high.

With the method of the present invention the metallurgy of the metalized substrates is protected during the consolidation. FIG. 1 demonstrates that the free energy of reaction is a measure of the "reactivity" of these metals and carbon with oxygen. The materials with more negative free energy of reaction will react with oxygen more easily. As indicated in FIG. 1, carbon is more reactive with oxygen than copper, tungsten, and molybdenum. Carbon is less reactive with oxygen than oxygen with titanium which indicates that other less reactive metals may be used for the sacrificial plate besides carbon. But carbon has other advantages in that when it reacts with oxygen, it does so in a gaseous product which leaves the plate so that the carbon remaining on the plate is still exposed to the oxygen left in the ambient for continued reactions. Therefore, with the apparatus shown in FIGS. 3–6, any oxygen molecules approaching the metalized substrate will react with the carbon plate first so that the metal wiring (such as copper, tungsten, and molybdenum and any other less reactive metallurgy) will be safe from oxidation during the high temperature consolidation process.

FIG. 2 demonstrates that with the ultra high purity (UHP) inert gasses (e.g.-helium and argon) and oxygen getters (which comprise a very reactive metal and a molecular sieve), copper wires will not be oxidized at the temperature range of 1000 to 1500° C. (1273 to 1773° K.) but tungsten, molybdenum and titanium will still be attacked by oxygen in this temperature range. From this it is apparent that UHP and oxygen getters by themselves cannot provide sufficient protection from oxidation for metal wires made of tungsten, molybdenum, and titanium for example. However, with the present invention's introduction of carbon, the oxygen partial pressure will be brought down to much lower levels so that molybdenum and tungsten will be free from oxidation. Thus, for ceramic substrates wired with metallurgy of less reactivity compared with carbon, the wiring can be saved through a high temperature process by using carbon as a sacrificial material to react with oxygen impurity. The carbon reacts with the oxygen to form carbon monoxide or carbon dioxide. Both carbon monoxide and carbon dioxide are gasses so that the molecules leave the carbon surface immediately after they are formed. Therefore, the carbon surface is continuously exposed to the ambient without being covered by the oxides which would hinder further reaction between the oxygen and the carbon. This makes carbon advantageous over other materials such as silicon or aluminum as the sacrificial species even though they are also very reactive with oxygen.

EXAMPLE

An FHD process was used to apply two layers of glass onto a metalized AL203 substrate having molybdenum wiring. The bottom layer of glass was deposited to an approximate thickness of 60 microns. The top layer of glass was deposited to an approximate thickness of 20–30 microns after consolidation. After deposition, the wired substrates were placed on carbon graphite plates for the consolidation step (as shown in FIG. 5). Inert gas was Purged through the consolidation furnace. The bottom layer of glass with a lower refractive index served as the cladding layer and the top layer of glass having a 1% higher refractive index served as the waveguide core layer. The cladding layer was 85% mole percentage silica (SiO2) doped with 13% boron oxide (B2O3), 1% phosphorous oxide (P2O3), and 1% gemanium dioxide (GeO2), whose thermal expansion coefficient is approximately $2.0 \times 10^{-6}$. The core layer was 80% silica (SiO2) doped with 11% gemanium dioxide (GeO2) in addition to 8.5% B2O3 and 0.5% P2O5. The thermal expansion coefficient of the core was approximately $2.5 \times 10^{-6}$. The waveguides showed good light guiding characteristics and the waveguide glass adhered to the ceramic substrates well. The stress on the glass film was estimated to be $3.0–3.5 \times 10^9$ dyne/cm$^2$ which is well below the glass yield strength $10^{10}–10^{11}$-dyne/cm$^2$ addition to good quality waveguides being formed on the ceramics, the degradation of the molybdenum (Mo) wiring was less than 5% for 1200° C. consolidation and less than 10% for 1300° C. consolidation.

While it will be apparent that the preferred embodiments of the invention disclosed herein provide the advantages and features above stated, it will be appreciated that the invention is susceptible to modification, variation and change without departing from the proper scope or fair meaning of the claims that are set out below. The experimental results described above are presented to further explain the invention but should not be construed in any way to limit the scope of the invention to the quantities or materials listed.

What is claimed is:

1. A method for forming an optical waveguide on a metalized substrate, said substrate containing wires, said method comprising the steps of: depositing glass on said substrate; placing said metalized substrate adjacent a carbon plate; exposing said metalized substrate while adjacent said carbon plate to the high temperatures of a consolidation furnace; and consolidating said glass into an optical waveguide on said substrate while controlling oxygen partial pressure through the reaction of oxygen with said carbon plate.

2. The method of claim 1, further comprising the step of: forming a pocket in said carbon plate to further surround said substrate.

3. The method of claim 1, wherein said substrate is made of a ceramic material.

4. The method of claim 3, wherein said ceramic material is AL203.

5. The method of claim 3, wherein said ceramic substrate is thick-film metal wired.

6. The method of claim 3, wherein said ceramic substrate is thin-film metal wired.

7. The method of claim 3, wherein said ceramic substrate is multilayer ceramics (MLC) with metal wiring 8. The method of claim 1, wherein said wires are made of a metal selected from the group consisting of copper, molybdenum, and tungsten.

9. The method of claim 1, wherein said wires are made of a metal which has less reactivity with oxygen than carbon has with oxygen.

10. A method of making an optical waveguide on a ceramic substrate containing wires, said method comprising the steps of: depositing glass soot layers onto said substrate; placing said substrate adjacent a carbon plate; consolidating said glass soot layers by application of heat into an optical waveguide; controlling oxidation of said wires during said consolidation by facilitating the reaction of oxygen with carbon of said carbon plate.

11. The method of claim 10, wherein said optical waveguide is comprised of a core layer and a cladding layer.

12. The method of claim 10, further comprising the step of: introducing oxygen getters to further reduce the oxygen concentration.

* * * * *